(No Model.)
A. H. WAGNER.
THRASHING MACHINE.
No. 396,785. Patented Jan. 29, 1889.
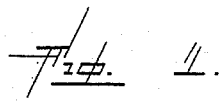
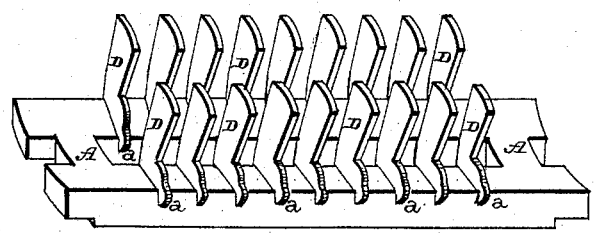
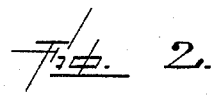
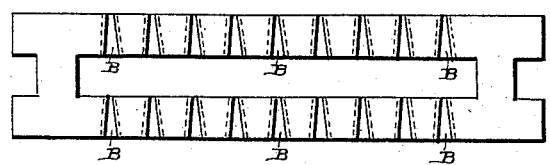

UNITED STATES PATENT OFFICE.

AWSBERT H. WAGNER, OF CHICAGO, ILLINOIS, ASSIGNOR TO ABEL H. FROST AND CHAS. L. AMES, BOTH OF SAME PLACE.

THRASHING-MACHINE.

SPECIFICATION forming part of Letters Patent No. 396,785, dated January 29, 1889.

Application filed May 26, 1888. Serial No. 275,129. (No model.)

*To all whom it may concern:*

Be it known that I, AWSBERT H. WAGNER, of Chicago, in the county of Cook and State of Illinois, have invented certain new and useful Improvements in Thrashing-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in thrashing-machines; and the object of my invention is to so construct the teeth that after they have been inserted in the grooves prepared to receive them in the cross-pieces of both the cylinder and concave the point of the inner end of each tooth can be bent down, so as to lock the teeth rigidly in position, and thus prevent them from becoming accidentally displaced.

Figure 1 is a perspective of the cross-piece of either a thrashing cylinder or concave, showing the teeth in position. Fig. 2 is a vertical section of the same, taken at one side of one of the teeth. Fig. 3 is a plan view of one of the cross-pieces, showing the shape of the groove.

In the upper side of each of the cross-pieces A of both the thrashing-cylinder and the concave which operates in connection therewith are formed any number of suitably-shaped grooves, B, which extend entirely across the face of the cross-piece, into which the lower ends of the correspondingly-shaped teeth D are inserted. The thickest ends of the teeth extend in the direction in which the cylinder revolves, so that the pressure brought against the teeth while the machine is in operation has a constant tendency to tighten the teeth in position. The bases of the teeth are made slightly longer than the cross-pieces are wide, and the extreme front ends, $a$, of the teeth are reduced in thickness, so that they can be readily bent down by means of a hammer, so as to catch against the front edges of the cross-pieces, and thus rigidly lock the teeth in position. The bent-down portions $a$ of each tooth serve to lock the teeth in position so securely that there is no possibility of the teeth becoming displaced until this bent-down portion has been broken or cut away.

Where the teeth are provided with screw-threads and have to be passed through the cross-pieces and then secured by means of nuts, the teeth are more expensive and require a great deal of time and trouble to secure them properly in position. By the construction here shown any boy with a hammer can insert the teeth into the grooves and then bend down the projecting ends. Not only are the teeth more readily and quickly secured in place, but their construction is greatly cheapened.

The grooves are preferably dovetailed; but any other form of groove which will serve to hold the inner ends of the teeth will answer. The teeth in the cylinder being set in opposite direction from those in the concave, the grooves are reversed, and hence the constant pressure of the grain against the teeth serves to bind both sets of teeth more tightly in place.

Having thus described my invention, I claim—

The combination of the cross-piece of a thrashing cylinder or concave having dovetailed grooves formed in its face at right angles to its length, with thrashing-teeth having their inner ends adapted to fit in said grooves and provided with projecting points on their inner ends, which points are to be bent down behind the cross-piece, so as to lock the teeth in place, substantially as shown and described.

In testimony whereof I affix my signature in presence of two witnesses.

AWSBERT H. WAGNER.

Witnesses:
J. TYLER POWELL,
FRANK SOUHRADA.